No. 622,873. Patented Apr. 11, 1899.
J. H. WELCH.
SOAP HOLDER.
(Application filed Sept. 13, 1897.)
(No Model.)
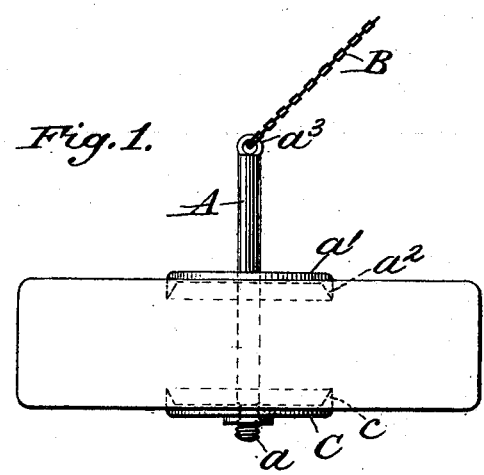
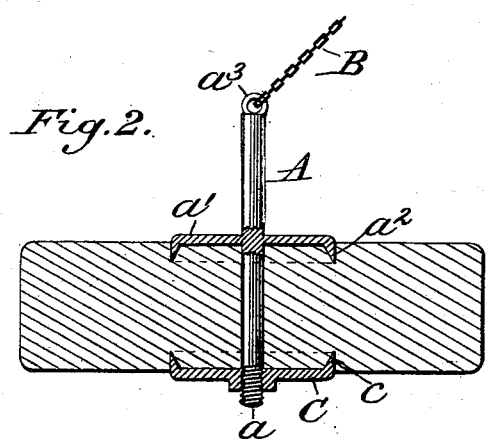
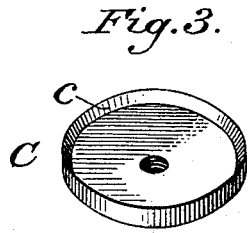
Witnesses
F. H. Schott
N. Mitchell
Inventor
James H. Welch
by Max Georgii
his Attorney
THE NORRIS PETERS CO., PHOTO-LITHO., WASHINGTON, D. C.